(12) United States Patent
Kim et al.

(10) Patent No.: US 8,347,229 B2
(45) Date of Patent: Jan. 1, 2013

(54) MULTIFUNCTION PERIPHERAL AND CONTROL METHOD THEREOF

(75) Inventors: Hyuck Kim, Seongnam-si (KR); Young-ei Cho, Seoul (KR); Pill-kyoung Moon, Anyang-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 145 days.

(21) Appl. No.: 11/581,332

(22) Filed: Oct. 17, 2006

(65) Prior Publication Data

US 2007/0157109 A1   Jul. 5, 2007

(30) Foreign Application Priority Data

Jan. 4, 2006  (KR) .................. 10-2006-0001013

(51) Int. Cl.
    *G06F 3/048* (2006.01)
(52) U.S. Cl. ......... 715/828; 715/773; 715/780; 715/846
(58) Field of Classification Search .................. 715/773, 715/846, 780, 828
    See application file for complete search history.

(56) References Cited

U.S. PATENT DOCUMENTS

| | | | |
|---|---|---|---|
| 5,331,555 A * | 7/1994 | Hashimoto et al. | 715/259 |
| 5,959,629 A | 9/1999 | Masui | |
| 6,138,079 A * | 10/2000 | Putnam | 702/50 |
| 6,560,638 B1 * | 5/2003 | Haneda et al. | 709/206 |
| 7,231,229 B1 * | 6/2007 | Hawkins et al. | 455/564 |
| 7,293,236 B2 | 11/2007 | Choi et al. | |
| 7,631,271 B2 * | 12/2009 | Griffith | 715/780 |
| 2002/0028697 A1 * | 3/2002 | Davies | 455/566 |
| 2002/0163534 A1 | 11/2002 | Choi et al. | |
| 2004/0139162 A1 | 7/2004 | Adams et al. | |
| 2006/0085749 A1 * | 4/2006 | Daniel et al. | 715/703 |

FOREIGN PATENT DOCUMENTS

| | | |
|---|---|---|
| CN | 1381781 | 11/2002 |
| JP | 2000-108453 | 4/2000 |
| KR | 100217748 | 6/1999 |
| KR | 2001-65817 | 7/2001 |

OTHER PUBLICATIONS

Korean Office Action dated Jan. 30, 2007 issued in KR 2006-1013.
Chinese Office Action issued Jan. 22, 2010 in CN Application No. 2006101494377.

* cited by examiner

*Primary Examiner* — Michael Roswell
*Assistant Examiner* — Sajeda Muhebbullah
(74) *Attorney, Agent, or Firm* — Stanzione & Kim, LLP

(57) ABSTRACT

A multifunction peripheral and a control method thereof include an input to provide an input screen through which an item is selected from a plurality of items to execute a plurality of operations, and data corresponding to the selected item is input, and a controller to control the multifunction peripheral such that when the data corresponding to the selected item is input, the input data is applied to execute the operations.

20 Claims, 5 Drawing Sheets

MULTIFUNCTION PERIPHERAL AND CONTROL METHOD THEREOF

CROSS-REFERENCE TO RELATED APPLICATIONS

This application claims priority under 35 U.S.C. §119(a) from Korean Patent Application No. 2006-1013 filed Jan. 4, 2006, in the Korean Intellectual Property Office, the entire disclosure of which is hereby incorporated by reference.

BACKGROUND OF THE INVENTION

1. Field of the Invention

The present general inventive concept relates to a multifunction peripheral and a control method thereof. More particularly, the present general inventive concept relates to a multifunction peripheral and a control method thereof, which provides an input screen for a user to easily input various items of data.

2. Description of the Related Art

A multifunction peripheral performs not only the operation of a printer which prints out data transmitted from a host computer, but also operations of a facsimile, a scanner, a copier, electronic mail, and other conventional devices. In other words, a multifunction peripheral combines operations of separate unit terminals such as the facsimile, the scanner, the copier and the printer into a single system.

In addition to basic operations such as printing, copying, faxing and scanning, recent developments in multifunction peripheral technologies have enabled the multifunction peripheral to suit the customer's needs for more elaborate operations such as emailing or faxing scanned data.

Meanwhile, a user of the multifunction peripheral is required to input data, such as text, according to the operation that the user selects.

Accordingly, the multifunction peripheral employs an adaptive input device such as a touch panel which provides a plurality of input screens so that users can input information therethrough. For example, using the touch panel, a text input screen such as a keyboard screen may be displayed so that necessary information, including the text, can be input.

In the conventional multifunction peripheral, a main screen initially appears on the touch panel, and then as a user selects an item from the main screen, the screen changes to an input screen where the user can input data corresponding to the selected item. The user may select options or input job commands by repeating the above procedures.

Figure 1A:
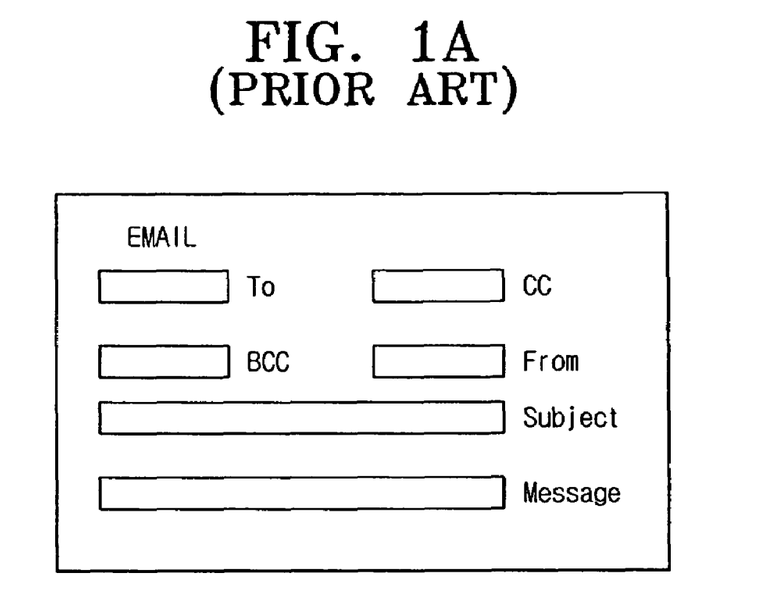
FIGS. 1A and 1B are views illustrating input screens of a conventional multifunction peripheral.
Figure 1B:
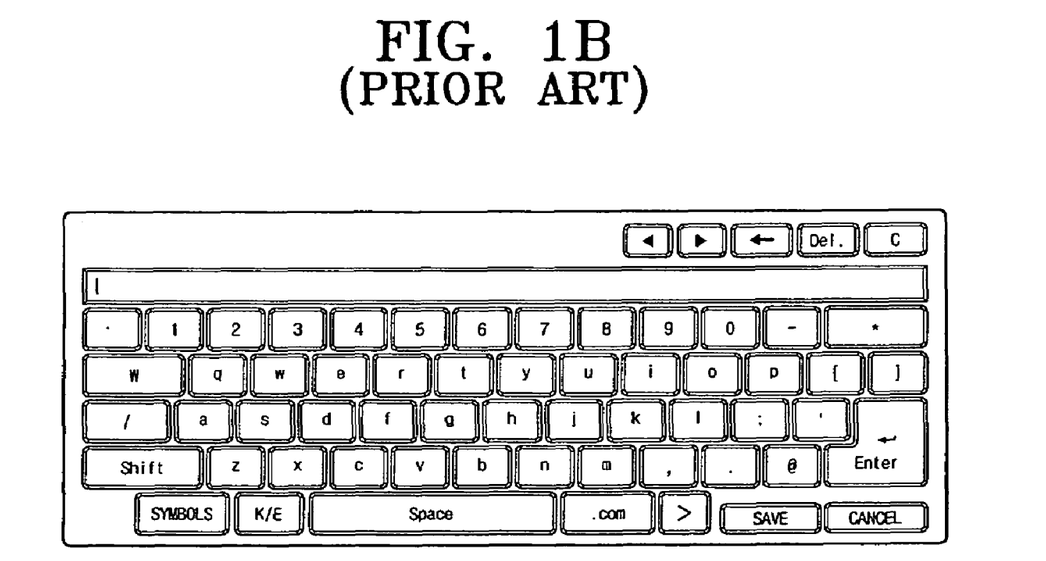

FIGS. 1A and 1B are views illustrating input screens of a conventional multifunction peripheral. FIG. 1A illustrates a main screen for inputting data related to an email on the touch panel screen of the conventional multifunction peripheral. FIG. 1B illustrates the keyboard screen on the touch panel screen of the conventional multifunction peripheral.

Referring to FIG. 1A, the main screen is an emailing input screen that includes input items for email such as "To", "CC", "BCC", "From", "Subject", and "Message". As a user selects one of the input items, an input screen for inputting data for the selected one of the input items, such as the keyboard screen as illustrated in FIG. 1B, appears on the touch panel screen.

As the user inputs data to each of the input items using the keyboard screen, the user then presses a confirm key to confirm the entry of the selected one of the input items. The confirm key may be an "Enter" key 110 or a "Save" key 120, and the input data are then stored. After confirming the entry of the input data, the touch panel screen returns to the main screen. That is, the main screen including the stored input data appears on the touch panel screen.

If the user wants to input data regarding another one of the input items, the user selects a desired item from the main screen, and accordingly, the touch panel again turns to the keyboard screen to receive data input by the user.

As described above, it takes repeated screen changes between the main screen and the keyboard screen as well as repeated data inputs and storage until the user finally inputs all the required data for an email transmission. Furthermore, it takes the same number of screen changes, data inputs and storages until the user finally completes making all necessary corrections to previously input data. Therefore, it is quite inconvenient and time consuming to input the data to a conventional multifunction peripheral.

SUMMARY OF THE INVENTION

The present general inventive concept provides a multifunction peripheral in which data for all items can be input through a single input screen without requiring frequent changes of screens, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a multifunction peripheral including an input providing an input screen through which an item is selected from a plurality of items to execute a plurality of operations, and data corresponding to the selected item is input, and a controller to control the multifunction peripheral such that when the data corresponding to the selected item is input, the input data is applied to execute the operations.

The input screen may include an item change button to select one among the plurality of items, and the controller controls the input to select one among the plurality of items in response to an input of the item change button.

The controller may control the input to select each of the plurality of items in a closed loop manner in response to an input of the item change button.

The input screen may also include an item display window to indicate the selected item among the plurality of items.

The input screen may also include an apply button to apply an input signal to the controller, after the data is input corresponding to the item displayed through the item display window and checked.

The controller may control in response to the input of the apply button to apply the input data to executing the respective functions, with maintaining the input screen so that another item is selected according to the input of the item change button.

The input may also include a phrase change button to select and input one among a plurality of preset phrases, the phrases comprising frequently used phrases during data input, and the controller controls in response to the input of the phrase change button such that one among the plurality of preset phrases is input.

The controller may control each of the plurality of items is selected in a closed loop manner in response to an input of the phrase change button.

The input screen may also include a phase display window to indicate the selected phrase.

The controller may control in response to the input of the phrase change button such that a phrase indicated in the phrase display window is selected and input.

The foregoing and/or other aspects and utilities of the present general inventive concept may be achieved by providing a control method of a multifunction peripheral, the method comprising providing an input screen through which an item is selected from a plurality of items to execute a plurality of operations and data corresponding to the selected item is input, selecting one among the plurality of items and inputting data corresponding to the selected item, and controlling the multifunction peripheral such that the input data is applied to execute the operations.

The foregoing and/or other aspects and utilities of the present general inventive concept may also be achieved by providing a method of operating a multifunction peripheral, including: receiving a selected item among a plurality of items to execute a plurality of operations and data corresponding to the selected item through an input screen, and controlling the multifunction peripheral to apply the data corresponding to the selected item to execute the operations when the corresponding data is received.

The method may further include receiving another item of the plurality of items and data corresponding to the another item when the data corresponding to the selected item is applied to execute the corresponding operation, and controlling the multifunction peripheral to apply the data corresponding to the another item to execute the operations when the data corresponding to the another item is received.

The operation of receiving can activate an item change operation to select another one among the plurality of items.

The foregoing and/or other aspects and utilities of the present general inventive concept may also be achieved by providing a multifunctional peripheral, including an interactive device to view and select an item from a plurality of items to execute a corresponding operation among a plurality of operations and to input data corresponding to the selected item, and an execution unit to apply the input data to execute the corresponding operation when the data corresponding to the selected item is input.

The interactive device may comprise an item change button to select one among the plurality of items, and the execution unit controls the selecting to select one among the plurality of items in response to a selection of the item change button The execution unit can control the selecting to select each of the plurality of items in a closed loop manner in response to a selecting of the item change operation

BRIEF DESCRIPTION OF THE DRAWINGS

The above aspects and features of the present general inventive concept will be more apparent by describing certain embodiments of the present general inventive concept with reference to the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
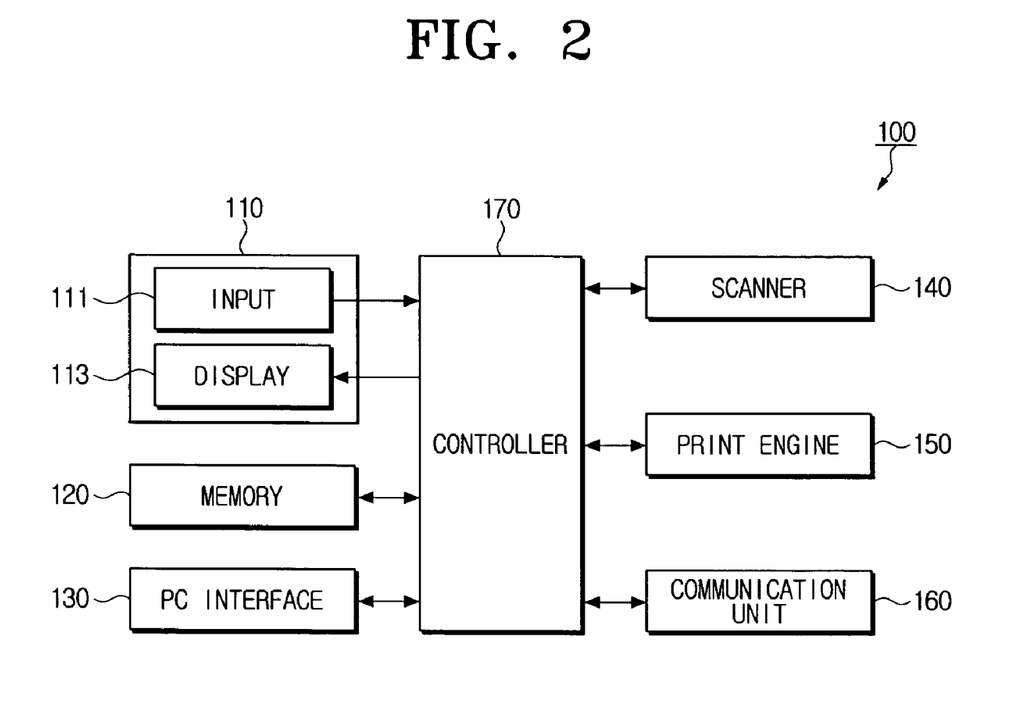
FIG. 2 is a schematic block diagram illustrating a multifunction peripheral according to an embodiment of the present general inventive concept.

FIG. 2 is a schematic block diagram of a multifunction peripheral 100 according to an embodiment of the present general inventive concept.

Referring to FIG. 2, the multifunction peripheral 100 includes an operation panel 110, a memory 120, a PC interface 130, a scanner 140, a print engine 150, a communication unit 160, and a controller 170.

The multifunction peripheral 100 includes independent operations, and the independent operations may include copying, scanning, printing and emailing. More specifically, the copying operation scans an original document and then prints a copy of the scanned original document using the scanner 140 and the print engine 150. The scanning operation scans the original document using the scanner 140. The printing operation prints the original document using the print engine 150. The emailing operation transmits and receives emails using the communication unit 150. An exemplary embodiment of the present general inventive concept will now be explained below, with particular reference to an example of an emailing operation.

The operation panel 110 includes an input device 111 and a display 113.

The input device 111 may be a touch panel screen, which initially provides a screen including a plurality of menu buttons with which users can select user commands or one among respective operations supported by the multifunction peripheral 100. When a user selects an operation menu from the initial screen, the screen changes to a corresponding main screen through which the user can set and select additional operations to execute the selected operation.

In order to input data items to execute a certain operation through the initial screen or the corresponding main screen of the input device 111, the input device 111 may change to an input screen containing a keyboard panel. For example, if the user selects an emailing menu from the initial screen, an emailing main screen appears. The emailing main screen includes fields containing data required for the emailing operation, and if the user selects one of the fields, such as "To," from the emailing main screen, an input screen appears so that the user can input data such as text. As the user presses buttons on the touch panel of the input device 111, corresponding input signals are transmitted to the controller 170, at which time the controller 170 can control the respective components of the multifunction peripheral 100 including the input device 111.

The keyboard has buttons which enable the user to input data such as text. The input device 111 may also provide an item change button 420 (see FIG. 4A) and an item display window, such as a phrase display window 510 (illustrated in see FIG. 5). As will be described later, the user can repeatedly press the item change button 420 until a desired item appears on the item display window.

The display 113 displays the operational status of the multifunction peripheral 100 according to the control of the controller 170, and may be a liquid crystal display (LCD).

The memory 120 includes a plurality of control programs to enable operations supported by the multifunction peripheral 100, firmware for the data processing, a nonvolatile memory (not illustrated) to store data such as data transmission protocols, and a volatile memory (not illustrated) to store data as the data is generated during an operation. The volatile memory (not illustrated) according to the present embodiment stores data which is input through the screens of the input device 111.

The PC interface 130 is connectible to an external device such as a host computer (not illustrated), and supports communication interface with the external device. The PC interface 130 may receive print data from the external device or transmit data such as scan data of the scanner 140 or data received from external communication terminals (not illustrated) to the external device.

The scanner 140 scans the original document and generates image data according to a control of the controller 170. The scanner 140 performs operations which can include the emailing, the scanning, and the copying operations. The image data obtained by the scanner 140 is converted into digital data and may be temporarily stored in a volatile memory of the memory 120, or printed by the print engine 150, or transmitted to the external communication terminals via the communication unit 160.

The print engine 150 prints out the print data according to a control of the controller 170. The print data may include the data received from the external device, the image data from the scanner 140, and mail data received through the communication unit 150.

As email is generated by the emailing operations, the communication unit 160 transmits the generated email to a mail server (not illustrated), and receives emails as they are transmitted from an external mail server. The emails received by the communication unit 160 may be stored in the volatile memory of the memory 120, or printed out by the print engine 130. The controller 170 converts the image data of the scanner 140 into digital data, and then converts the digital data according to email transmission standards. The communication unit 160 may transmit and receive the emails using a local area network (LAN) or a public switched telephone network (PSTN).

According to the control programs stored in the nonvolatile memory (not illustrated) of the memory 120, the controller 170 controls overall operations of the multifunction peripheral 100. For example, the controller 170 according to an exemplary embodiment of the present general inventive concept controls the multifunction peripheral 100 such that when data is input through an input screen of a data item selected through the input device 111, the input data is stored in the volatile memory (not illustrated) of the memory 120 and then the corresponding operation is carried out using the stored data.

For example, if the emailing operation is selected through the initial screen of the input device 111, the controller 170 controls the input device 111 to change the screen to the emailing main screen, and as the data item is selected from the emailing main screen, the input device 111 changes to an input screen through which the user can input data necessary for the emailing operation(s), such as the text.

Meanwhile, the controller 170 controls the multifunction peripheral 100 such that when data is input to the data item selected from the input screen displayed by the input 111, the input data is stored in the volatile memory of the memory 120, while when the data item is changed according to the data input through the item change button, the changed item is displayed on the input screen and data is input through the keyboard buttons of the input screen.

An exemplary embodiment of the present general inventive concept has been explained above with reference to the example of the emailing operation. However, it will be appreciated that the present general inventive concept is not limited to the above example only.

Figure 3:
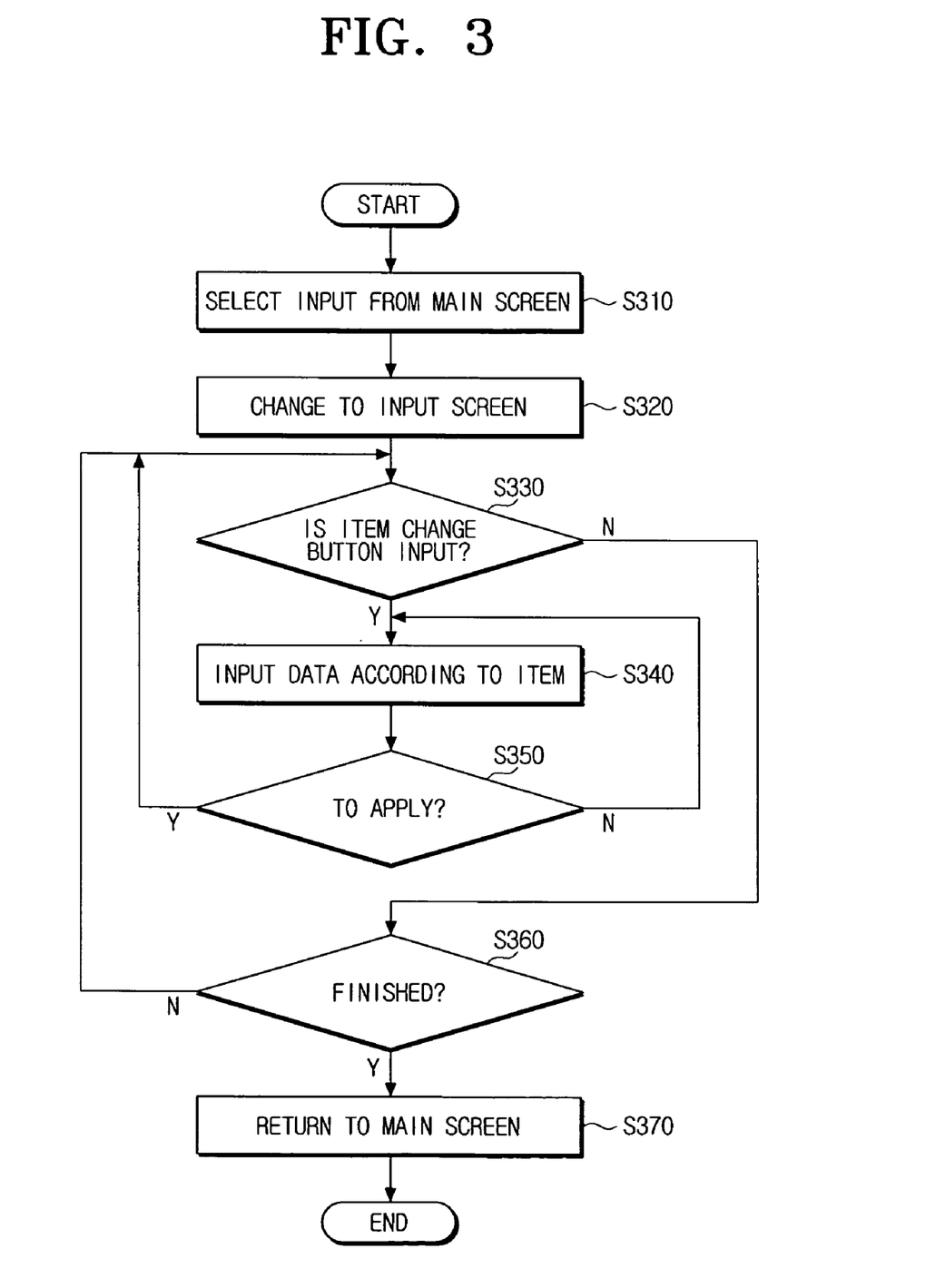
FIG. 3 is a flowchart illustrating a method of operating a multifunction peripheral according to an embodiment of the present general inventive concept.
Figure 4A:
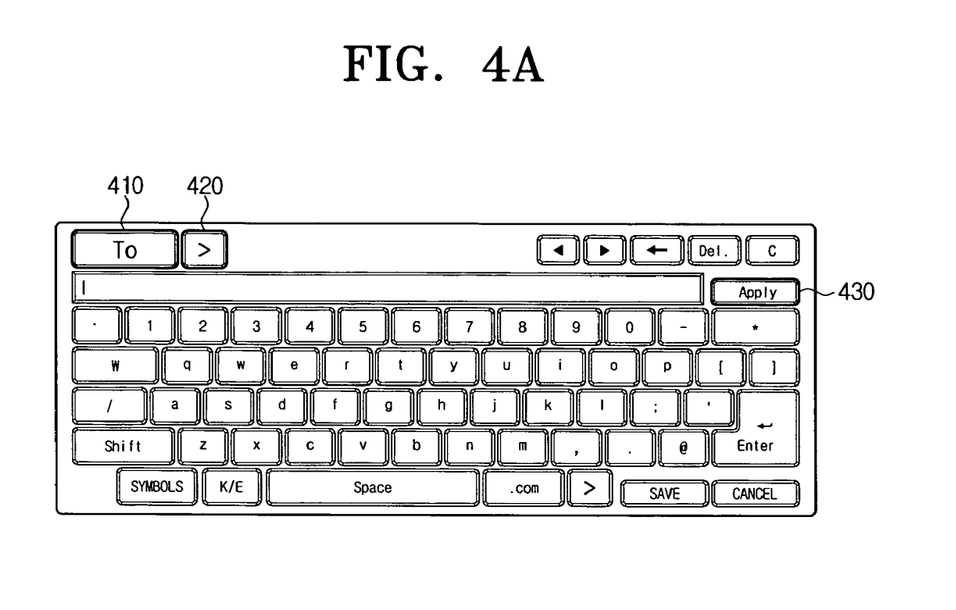
FIG. 4A is a view illustrating an input screen of the multifunction peripheral of FIG. 2.
Figure 4B:
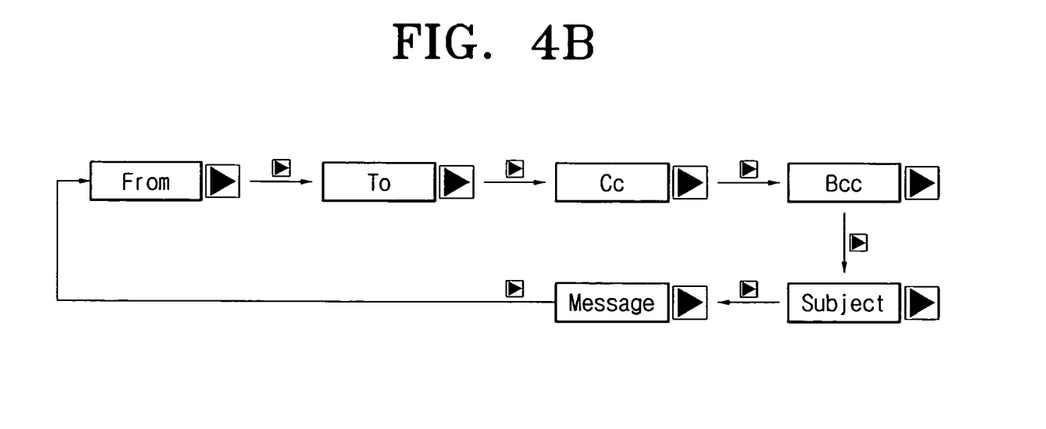
FIG. 4B is an operational diagram illustrating a data input sequence of the multifunction peripheral of FIG. 2.

FIG. 3 is a flowchart illustrating a method of operating the multifunction peripheral 100 according to an embodiment of the present general inventive concept. FIG. 4A is a view illustrating the input screen of the multifunction peripheral of FIG. 2 and FIG. 4B is an operational diagram illustrating a data input sequence of the multifunction peripheral of FIG. 2. Accordingly, the operation of the multifunction peripheral according to an exemplary embodiment of the present general inventive concept will be described below with reference to FIGS. 2, 3, 4A and 4B.

Referring to FIGS. 2 and 3, if the user selects the emailing function from the initial screen, the input device 111 changes to the main screen of the emailing operation.

In order to input data, the user selects a data item from the emailing main screen (Operation S310), and thus the input device 111 changes to an input screen (Operation S320).

FIG. 4A illustrates an exemplary input screen, which may include a keyboard to input the data, such as text, an item change button 420 to change the data item, an item display window 410 to display the selected data item, and an apply button 430 to confirm the input of the data.

The data items may be changed in a closed loop fashion where each press of the item change button 420 consecutively activates one of the data items until a previously selected data item repeats. For example, if six (6) data input items are provided, the user can consecutive change six of the data input items by pressing the item change button 420 six times. For example, FIG. 4B illustrates six data input items of the emailing operation, which are, "From", "To", "Cc", "Bcc", "Subject", and "Message". If the user presses the item change button 420 with the first item "From" being currently displayed through the item display window 410, the next item "To" is selected and thus displayed through the item display window 410. In this way, "Cc", "Bcc", "Subject" and "Message" may be displayed in order as the user presses the item change button 420. If the user presses the item change button 420 with the last item "Message" being currently displayed, the first item "From" is displayed.

Accordingly, the controller 170 determines whether the data item needs to be changed according to the item change button 420 (Operation S330), and if the item change button 420 is input, the input device 111 is controlled to change the data item and display the changed data item through the item display window 410, so that data can be input to the displayed item (Operation S340).

After having input corresponding data to the data item, the user presses the apply button 430, and the controller 170 determines whether to apply the data input or not according to whether the apply button 430 is pressed by the user (Operation S350).

When the user presses the apply button 430, an input signal corresponding to the input data is transmitted to the controller 170. Thus, the controller 170 stores the data in the volatile memory of the memory 120, and performs the corresponding operation using the stored data. The apply button 430 is to check and confirm the data as input. The input screen remains even after the input of the apply button 430 so that the user can continuously change data items using the item change button 420 and input corresponding data.

After having input all the necessary data for the data items, the user presses an enter button, and the controller 170 determines if data input is completed (Operation S360). If it is determined that the data input is completed, the controller 170 returns the input device 111 to the initial screen (Operation S370). As described above, the data for all the data items can be input without requiring repeated screen changes.

Figure 5:
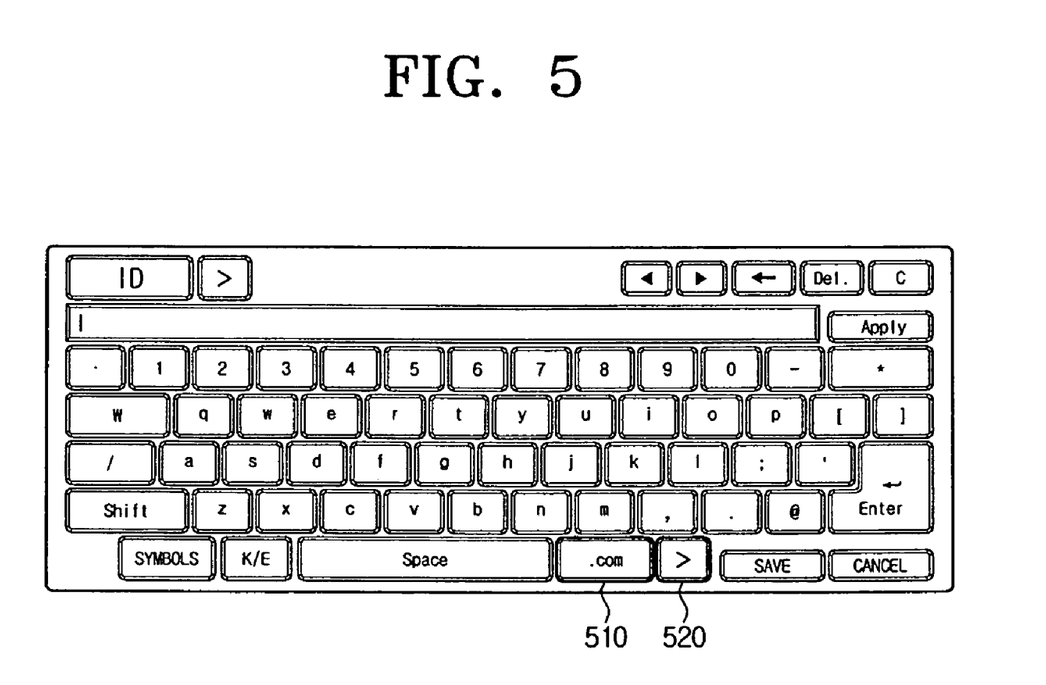
FIG. 5 is a view illustrating the touch panel screen of the multifunction peripheral of FIG. 2.

FIG. 5 is a view illustrating the touch panel screen of the multifunction peripheral of FIG. 2. With reference to FIG. 5, the input screen may include a phrase display window 510 and a phrase change button 520. The phrase display window 510 displays a phrase that the user may select to be entered into the data item.

Particularly, the phrase may include the frequently used phrases such as ".com", ".org", or ".net", and it may be provided as a default or may be directly input and set by the user. In present embodiment, a plurality of phrases are set and used in the closed loop pattern. Thus, the phrases are changed through the phrase change button 520, which may be displayed beside the phrase display window 510, and input to the currently selected input item without requiring any further operation of the user. After the user inputs data including the frequently used phase entered through the phase display window 510, and checks the input, the user may complete the data input by pressing the enter button.

As described above, the present general inventive concept provides that data are input to a plurality of input items through a single input screen. Therefore, frequent changes of screens and a consequent loss of time and inconvenience to user can be prevented.

As described above, because input items can be changed and applied with a simple operation of the user, data input is much more efficient and is more convenient for a user.

As described above, because frequently used phrases can be conveniently used as needed, data input is even more efficient.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multifunction peripheral which performs at least one of faxing, scanning, copying, emailing, and printing as a single system, comprising:
an input providing an input window comprising:
a single item display area to display an item selected from a plurality of data input items necessary to execute one of the plurality of operations;
an input area having a plurality of keys provided in a keyboard type screen to allow a user to input data regarding the selected item; and
an item change button to select an item from the plurality of data input items to be displayed in the single item display area; and
a controller to control the input such that the data input on the input area is applied to the selected item, and whenever the item change button is input, an item is selected from the plurality of items,
wherein the controller controls the input such that even when an item in the single item display area is changed according to an input of the item change button, the input area remains.

2. The multifunction peripheral of claim 1, wherein the controller controls the input to select each of the plurality of items in a closed loop manner in response to an input of the item change button.

3. The multifunction peripheral of claim 1, wherein the input window further comprises an apply button to apply an input signal to the controller after the data is input corresponding to the item displayed through the item display window and checked.

4. The multifunction peripheral of claim 3, wherein the controller controls the input, in response to the input of the apply button, to apply the input data to execute the respective operations, and to change only the single item display area so that another item can be selected according to the input of the item change button.

5. The multifunction peripheral of claim 1, wherein the input window further comprises a phrase change button to select and input one among a plurality of preset phrases, the phrases comprising frequently used phrases during data input, and
the controller controls in response to the input of the phrase change button such that one among the plurality of preset phrases is input.

6. The multifunction peripheral of claim 5, wherein the controller controls such that each of the plurality of items is selected in a closed loop manner in response to an input of the phrase change button.

7. The multifunction peripheral of claim 5, wherein the input window further comprises a phrase display window to indicate the selected phrase.

8. The multifunction peripheral of claim 7, wherein the controller controls in response to the input of the phrase change button such that a phrase indicated in the phrase display window is selected and input.

9. The multifunction peripheral of claim 1, wherein the data input item relates to an operation of emailing of the multifunction peripheral.

10. A control method of a multifunction peripheral which performs at least one of faxing, scanning, copying, emailing, and printing as a single system, the method comprising:
selecting an operation of the multifunction peripheral;
providing an input window comprising:
a single item display area to display an item selected from a plurality of data input items necessary to execute one of the plurality of operations;
an input area having a plurality of keys provided in a keyboard screen to input data regarding the selected item; and
an item change button to select an item from the plurality of data input items to be displayed in the single item display area;
receiving a input of data regarding the item selected form the plurality of items;
applying the input data to the selected item, and whenever the item change button is input, selecting an item from the plurality of items,
wherein the selecting does not change the input area even when an item in the single item display area is changed according to an input of the item change button.

11. The control method of claim 10, wherein the operation of inputting selects each of the plurality of items in a closed loop manner in response to an input of the item change button.

12. The control method of claim 10, wherein the input window further comprises an apply button to apply an input signal to the controller after the data is input corresponding to the item displayed through the item display window and checked.

13. The control method of claim 12, wherein the operation of selecting, in response to the input of the apply button, applies the input data to execute the respective operations, and converts only the single item display area so that another item can be selected according to the input of the item change button.

14. The control method of claim 10, wherein the operation of inputting uses a phrase change button to select and input one among a plurality of preset phrases, the phrases comprising frequently used phrases during data input, and comprising:
   inputting the phrase change button for a predetermined number of times to select one among the plurality of phrases; and
   controlling the multifunction peripheral such that one among the plurality of preset phrases is selected and input when the phrase change button is input as many times as the predetermined number of times.

15. The control method of claim 14, wherein in the operation of selecting and inputting the phrase, each of the plurality of items is selected in a closed loop manner according to the number of inputs on the phrase change button.

16. The control method of claim 14, further comprising displaying the selected phrase on a phrase display window to indicate the selected phrase.

17. The control method of claim 16, wherein the operation of selecting and inputting the phrase controls the multifunction peripheral such that a phrase indicated in the phrase display window is selected and input according to the number of inputs on the phrase change button.

18. The multifunction peripheral of claim 10, wherein the data input item relates to an operation of emailing of the multifunction peripheral.

19. A multifunctional peripheral which performs at least one of faxing, scanning, copying, emailing, and printing, comprising:
   an interactive device to view and select an item from a plurality of items to execute a corresponding operation among a plurality of operations and to input data corresponding to the selected item; and
   an execution unit to apply the input data to execute the corresponding operation when the data corresponding to the selected item is input,
   wherein the interactive device provides an input window comprising:
      a single item display area to display an item selected from a plurality of data input items necessary to execute one of the plurality of operations;
      an input area having a plurality of keys provided in a keyboard type to input data regarding the selected item; and
      an item change button to select an item from the plurality of data input items to be displayed in the single item display area, and
   wherein the execution unit controls the interactive device to select and display in the single item display area an item from the plurality of data input items according to a selection of the item change button.

20. The multifunction peripheral of claim 19, wherein the execution unit controls the selecting to select each of the plurality of items in a closed loop manner in response to a selecting of the item change operation.

* * * * *